(12) United States Patent
Jacobs

(10) Patent No.: US 7,273,196 B2
(45) Date of Patent: Sep. 25, 2007

(54) SYSTEM FOR VEHICLE ATTITUDE AND/OR MOMENTUM CONTROL

(75) Inventor: Jack H. Jacobs, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/980,929

(22) Filed: Nov. 3, 2004

(65) Prior Publication Data

US 2006/0091261 A1    May 4, 2006

(51) Int. Cl.
*B64G 1/28* (2006.01)

(52) U.S. Cl. .................................................. 244/165

(58) Field of Classification Search ............... 244/165, 244/171, 164; 310/32, 244, 40 R; 74/5.34
See application file for complete search history.

(56) References Cited

U.S. PATENT DOCUMENTS

| | | | | |
|---|---|---|---|---|
| 3,127,774 A | * | 4/1964 | Fischer et al. .............. | 318/649 |
| 3,143,892 A | * | 8/1964 | Chapman .................... | 74/5.34 |
| 5,261,631 A | * | 11/1993 | Bender et al. .............. | 244/165 |
| 5,406,858 A | * | 4/1995 | Brainard .................... | 74/5.34 |
| 5,611,505 A | * | 3/1997 | Smay ........................ | 244/165 |
| 6,113,033 A | * | 9/2000 | Parks et al. ................ | 244/165 |
| 6,534,887 B1 | * | 3/2003 | Peczalski et al. .......... | 310/90.5 |

FOREIGN PATENT DOCUMENTS

EP    0496184 A1    7/1992
WO    WO 02/29268 A2    4/2002

OTHER PUBLICATIONS

PCT International Search Report PCT/US2005/039858, Aug. 1, 2006.

* cited by examiner

*Primary Examiner*—Tien Dinh
(74) *Attorney, Agent, or Firm*—Ingrassia Fisher & Lorenz

(57) ABSTRACT

A vehicle control system is provided that includes a slat having an axis, a plurality of microwheels disposed on the slat, each microwheel having a first stator wafer, a second stator wafer, and a rotor wafer disposed therebetween, the first and second stator wafers configured to spin the rotor wafer, and an actuator coupled to the slat and configured to at least partially rotate the slat about the axis.

24 Claims, 3 Drawing Sheets

SYSTEM FOR VEHICLE ATTITUDE AND/OR MOMENTUM CONTROL

FIELD OF THE INVENTION

The present invention generally relates to a spacecraft, and more particularly relates to a system for vehicle and attitude and/or momentum control of a spacecraft.

BACKGROUND OF THE INVENTION

Spacecraft, such as satellites, typically use attitude and/or momentum control systems, such as control moment gyroscopes (CMG) and reaction wheel assemblies (RWA), for positioning and rotation. CMGs operate by producing a relatively large torque along a first axis when a spinning rotor is rotated with a smaller torque about an axis perpendicular to the rotor spin axis. Accordingly, combinations of CMGs (usually three or more in an array) may be arranged in non-coincidental mounting planes so that the torques may be applied, using various combinations, in any desired direction of rotation. CMGs are most commonly used where large and/or rapid motions, or high inertia equipment, need to be moved with high precision such as in spacecraft slew maneuvers. In contrast, RWAs include a spinning rotor that exerts a relatively small torque along the spin axis as the rotor is caused to spin faster or slower. RWAs may be disposed with several reaction wheels (usually three or more in an array) aligned to cause rotation in any direction. RWAs are usually used where smaller movements are necessary, such as controlling the direction of scan of a sensor, or detector, such as small camera or radar antenna in spacecraft, which operate to view areas or targets on the earth. RWAs are also used to store momentum that is built up by small externally applied torques acting over a long period of time.

Although conventional CMGs and RWAs operate well in many spacecraft, it has been found that both operate less effectively when disposed within a small spacecraft, such as in those spacecraft weighing less than 150 kg. Small spacecraft, increasingly being used to deliver large payloads, may have limited space for containing spacecraft components and thus, the CMGs and RWAs employed therein are smaller. However, smaller-sized CMGs and RWAs may not provide enough torque that may be preferable for moving the payload with the desired agility.

Accordingly, it is desirable to have an attitude and/or momentum control system that is capable of providing an adequate amount of torque to move a large payload. In addition, it is desirable for an attitude and/or momentum control system to be capable of being implemented into a small spacecraft. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An attitude control system is provided that includes a slat having an axis, a plurality of microwheels disposed on the slat, each microwheel having a first stator wafer, a second stator wafer, and a rotor wafer disposed therebetween, the first and second stator wafers configured to spin the rotor wafer, and an actuator coupled to the slat and configured to at least partially rotate the slat about the axis.

In another embodiment, the attitude control system includes a plurality of slats each having an axis, a plurality of microwheels disposed on the slat, each microwheel having a first stator wafer, a second stator wafer, and a rotor wafer disposed therebetween, the first and second stator wafers configured to levitate and spin the rotor wafer, and an actuator coupled to the plurality of slats and configured to rotate each of the slats of the plurality of slats about each axis.

In still another embodiment, a vehicle is provided that includes a housing, a plurality of slats disposed within the housing, a plurality of microwheels disposed on each of the slats, each microwheel having a first stator wafer, a second stator wafer, and a rotor wafer disposed therebetween, the first and second stator wafers configured to spin the rotor wafer, and an actuator coupled to the plurality of slats.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. It will be appreciated that although the invention is described as being implemented in a microsatellite, the invention may be employed in any one of numerous types of crafts, including, but not limited to aircraft, watercraft, and ground vehicles.

Figure 1:
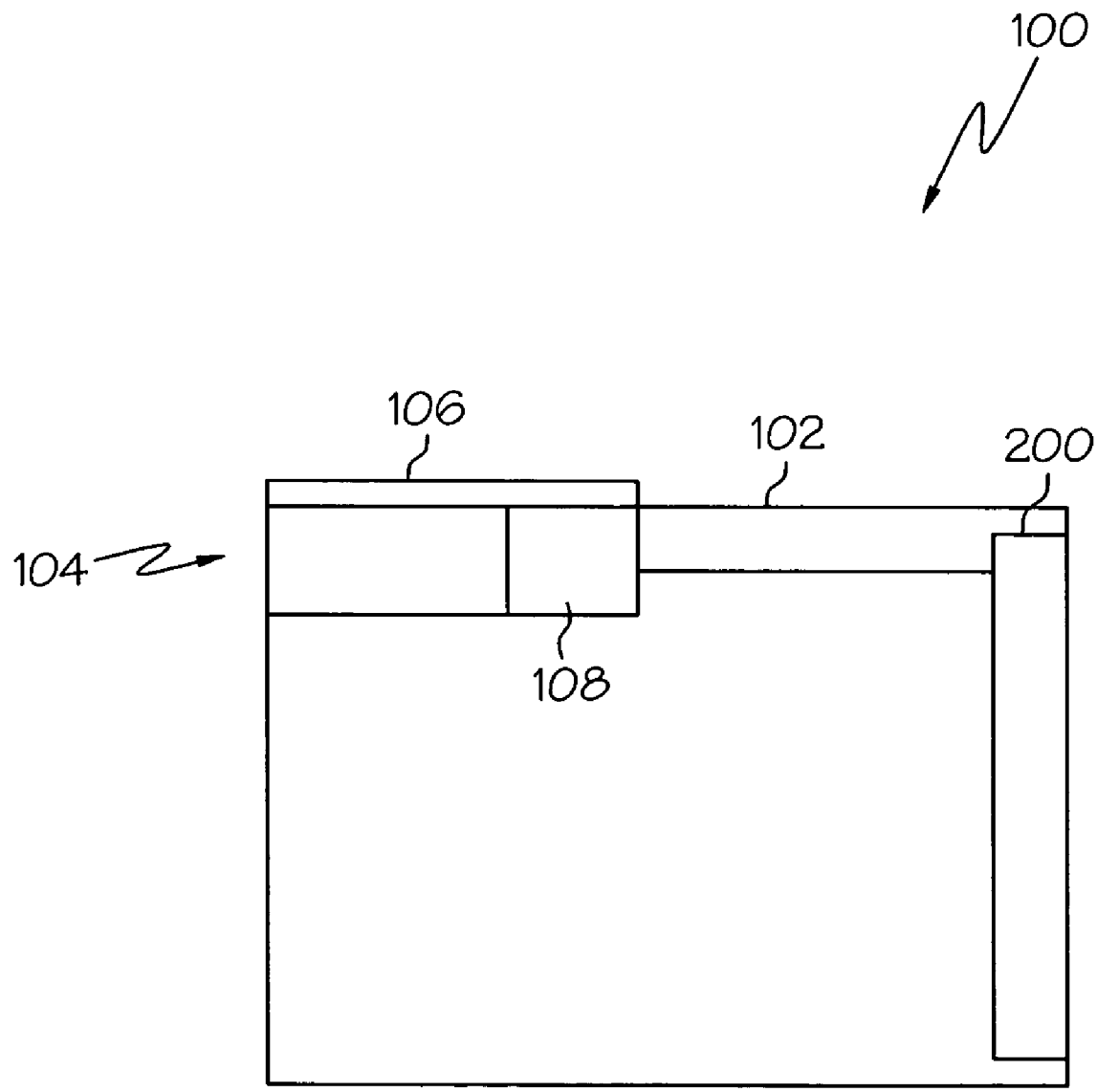
FIG. 1 is a simplified schematic diagram of an exemplary vehicle, such as a microsatellite.

FIG. 1 depicts an exemplary vehicle 100, such as a microsatellite that includes a housing 102, a power subsystem 104, and a vehicle control system 200 disposed therein. The housing 102 is configured to withstand potentially extreme temperature and pressure changes to which the vehicle 100 may be subjected when it is launched into space and/or in orbit. It will be appreciated that the housing 102 may be constructed of any one of numerous types of appropriate materials and have any one of numerous suitable sizes and shapes.

The power subsystem 104 includes a power supply 106 and a power storage unit 108. The power supply 106 can be implemented using any one of numerous types of suitable devices that supply power, such as, for example, solar panels. The power storage unit 108 is coupled to the power supply 106 and stores power received therefrom. One or both of the power supply 106 and power storage unit 108 are coupled to the vehicle control system 200 and are configured to supply power thereto. The power storage unit 108 may be a battery, a capacitor, or any other suitable device.

Figure 2:
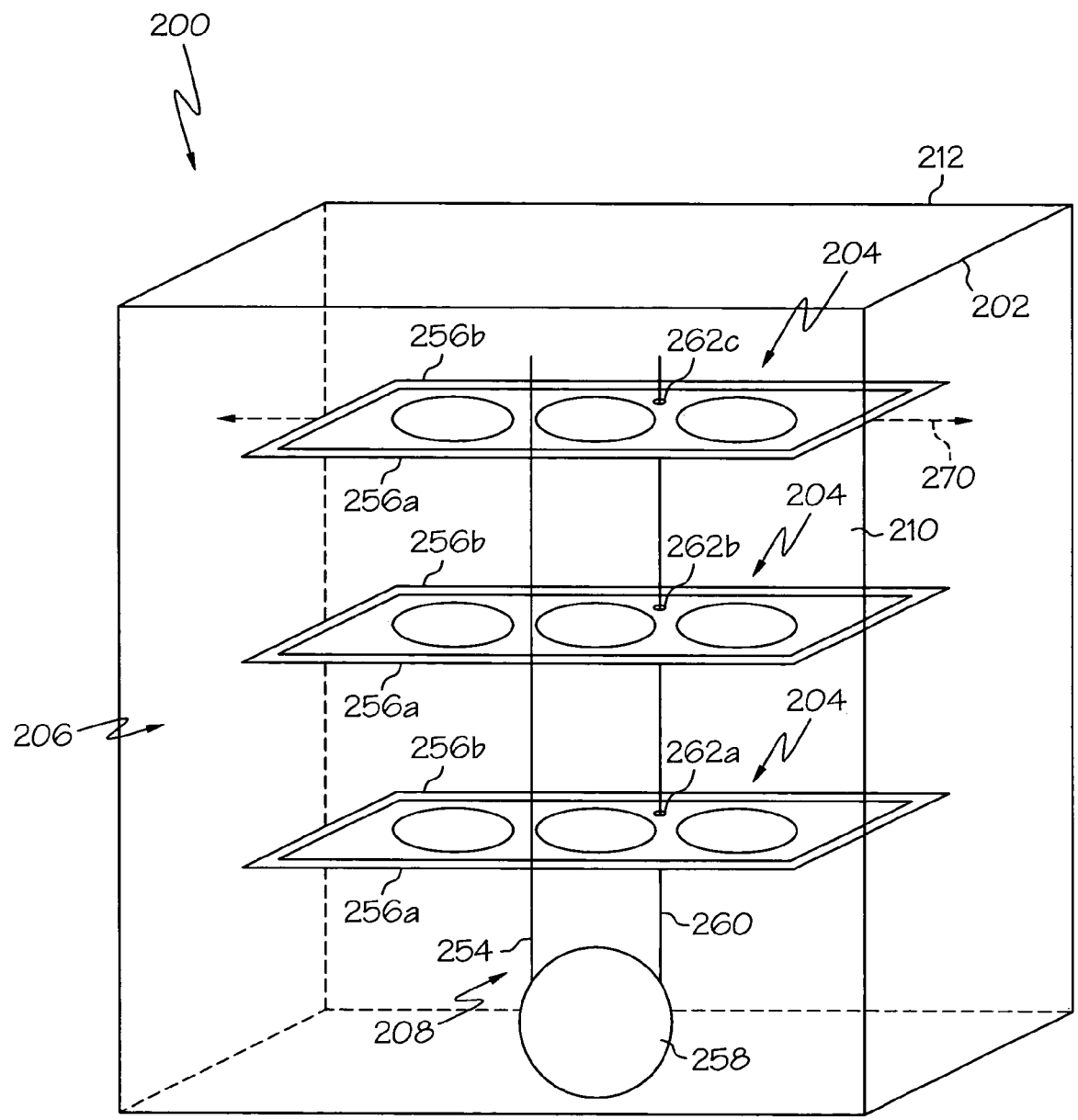
FIG. 2 is an exemplary attitude control apparatus that may be used in the exemplary vehicle of FIG. 1.

The vehicle control system 200 is configured to provide 3-axis attitude and/or momentum control for the vehicle 100. With reference to FIG. 2, the vehicle control system 200 includes a plurality of slats 206, an actuator 208, and a plurality of microwheels 204. The plurality of slats 206 may be disposed in the vehicle 100 in any one of numerous fashions. In one exemplary embodiment, the plurality of slats 206 is mounted to a wall of the vehicle 100. In another exemplary embodiment, which is depicted in FIG. 2, the plurality of slats 206 is disposed within a slat housing 202 that includes at least two walls 210, 212 that are opposite one another and may have any one of numerous suitable shapes and/or sizes. For example, the walls 210, 212 may be at least partially curved or substantially flat. In one example, the two walls 210, 212 are configured to conform to the shape of the vehicle housing 102. In another exemplary embodiment, the walls 210, 212 are configured to couple to the vehicle housing 102.

It will be appreciated that although three slats 206 are shown, more or fewer slats may be employed. Moreover, although each slat 206 is shown to have substantially the same length, the individual slats 206 may vary in length. Each of the slats 206 is substantially parallel with one another and each is configured to provide a surface to which the plurality of microwheels 204 is coupled. In one exemplary embodiment, the slats 206 are also configured to deliver electricity to the microwheels 204. Thus, the slats 206 can be constructed of any one of numerous suitable materials. In one exemplary embodiment, the slats 206 are made of circuit board material. In another exemplary embodiment, the slats 206 include electrical circuitry that are coupled thereto and that electrically couple the power supply 108 to the microwheels 204.

The actuator 208 is coupled to the plurality of slats 206 and is configured to tilt the slats 206 to thereby rotate each slat 206 about a respective axis, depicted in this embodiment as a longitudinal axis 270. The actuator 208 may have any one of numerous configurations. For example, the actuator may be electrically, pneumatically, hydraulically, or manually activated. In one exemplary embodiment, such as in FIG. 2, the actuator 208 includes a rod 254 and an actuating mechanism 258. The rod 254 is coupled to the slats 206 and the actuating mechanism 258. It will be appreciated that each of these components may be coupled to one another in any one of numerous conventional manners. For example, in one embodiment, the slats 206 each have longitudinal edges 256a, 256b which couple to the rod 254. When the actuating mechanism 258 is actuated, the rod 254 causes the slats 206 to tilt the edges 256a, 256b either up or down. The actuating mechanism 258 may be any one of numerous devices capable of causing the rod 254 to move and may be configured to be activated by any one of a number of methods, such as, for example, electrically, hydraulically, pneumatically, or manually.

In another exemplary embodiment, the actuator 208 includes cords 260, instead of, or in combination with rods. Similar to the rods, the cords 260 may be coupled to the slat longitudinal edges 256a, 256b and actuating mechanism 258. In other embodiments, the slats 206 each include apertures 262a, 262b, 262c formed proximate the longitudinal edges 256a, 256b such that when the slats 206 are appropriately positioned, the apertures 262a, 262b, 262c are aligned with one another. The cords 260 are then threaded through the apertures 262a, 262b, 262c and configured to support each slat 206. The actuating mechanism 258 is configured to pull the cords 260, when activated, and cause the slats 206 to rotate. It will be appreciated that more than one rod 254 and/or cord 260 may be coupled to the slats 206 and the additional rod 254 and/or cords 260 may be coupled to the same longitudinal edges 256a, 256b or another edge of the slats 206.

Figure 3:
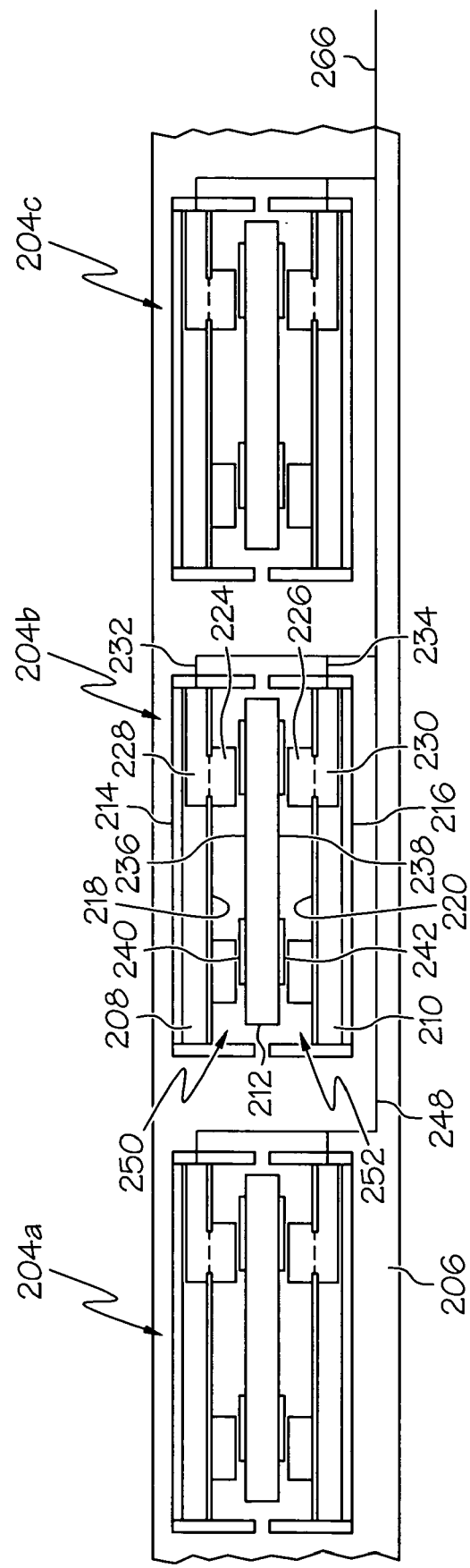
FIG. 3 is a slat that may be used in the exemplary attitude control apparatus of FIG. 2.

Turning to FIG. 3, a cross section of one of the plurality of slats 206 is provided. Disposed on the slat 206 is one of the pluralities of microwheels 204 and electronic circuitry 248. It will be appreciated that although three microwheels are shown, fewer or more microwheels may be employed as well. Each microwheel 204 is preferably substantially equally sized and between about 1 and 6 inches in diameter, most preferably about 2 inches in diameter. However, the microwheels 204 may be smaller or larger, depending on the overall size and configuration of the vehicle 100. It will be appreciated that if the microwheels 204 are smaller in size, it may be preferable to employ more microwheels 204. Each microwheel 204 includes a first stator wafer 208, a second stator wafer 210, and a rotor wafer 212 disposed therebetween. The first and second stator wafers 208, 210 are configured to rotate the rotor wafer 212. Any one of numerous suitable configurations may be employed to implement this functionality.

The first and second stator wafers 208, 210 may be configured to operate in any one of numerous manners, for example, electromagnetically, magnetically, electrostatically, or mechanically, to spin the rotor wafer 212. In one example, the first and second stator wafers 208, 210 each have an outer surface 214, 216, an inner surface 218, 220, an electromagnetic coil 224, 226, and electronic components 228, 230. The first and second stator wafers 208, 210 are constructed of silicon; however, it will be appreciated that any other suitable material may be used as well. Additionally, the stator wafers 208, 210 may have any one of numerous shapes that accommodate the rotor wafer 212 therebetween. In one exemplary embodiment, the inner surfaces 218, 220 are spaced apart from one another to thereby define a cavity 250, 252 within which the rotor wafer 212 is disposed.

The electromagnetic coils 224, 226 are configured, upon energization to generate a magnetic field across each of the first stator wafer 206 and second stator wafer 208, and are preferably coupled to the inner surfaces 216, 218 of each of the first and second stator wafers 206, 208. Any one of numerous types of electromagnetic coils 224, 226 constructed of any one of numerous appropriate materials may be used. For example, the electromagnetic coils 224, 226 may be a conductive material, such as a copper ring, with a wire coil wrapped around the ring. The electronic components 228, 230 are coupled to each of the electromagnetic coils 224, 226, and are configured to provide power to the electromagnetic coils 224, 226. The electronic components 228, 230 may be any conventional circuit configuration capable of supplying power to the electromagnetic coils 224, 226. In one exemplary embodiment, a multichip module material (MCM) is implemented. No matter the implementation, the electronic components 228, 230 are attached to the first stator wafer 206 and second stator wafer 208, respectively, and each includes an electrical interface 232, 234 that is configured to allow the microwheel 204 to electrically couple to electrical connections in the tube 202, which will be discussed in detail further below.

As briefly mentioned above, the rotor wafer 212 is configured to spin between the first and second stator wafers 206, 208 in any one of numerous manners. In one exemplary embodiment, the rotor wafer 212 levitates between the upper and lower stator wafers 206, 208, for example, magnetically, or electromagnetically, or by other related methods, and includes an upper surface 236, a lower surface 238, and upper and lower magnets 240, 242. The upper magnet 240 is coupled to the rotor wafer upper surface 236 and the lower magnet 242 is coupled to the rotor wafer lower surface 238.

Any one of numerous magnetic materials may be used for the magnets 240, 242, however, in one embodiment, permanent magnets constructed from permalloy are employed. In another exemplary embodiment, the rotor wafer 212 is configured to mechanically spin between the stator wafers 206, 208, and bearings, or other mechanical devices, are used in place of the magnets. The rotor wafer 212 may constructed of any suitable material, such as silicon.

It will be appreciated that other microwheel configurations may also be employed, such as those disclosed in U.S. Pat. No. 6,534,887 entitled "Microwheel" issued to Honeywell International Inc. on Mar. 18, 2003, the entirety of which is incorporated herein by reference.

The electronic circuitry 248 is configured to deliver current to the microwheels 204a, 204b, 204c and may be implemented using any conventional configuration. In one example, the electronic circuitry 248 is a plurality of wires that extends through the rod 254 or cord 260 and along the length of the slat 206. The wires are configured to be capable of electrically coupling with the electrical interfaces 232, 234 and may be embedded in the slat 206. The electronic circuitry 248 includes an input end 266 that is electrically coupled to and receives power from the power subsystem 104. In one exemplary embodiment, the electronic circuitry 248 is a wire wrap or a slip ring coupled to the slat 206.

When the power subsystem 104 supplies power to the electronic circuitry 248, the circuitry 248 deliver power to the electronic components 228, 230 which, in turn, deliver power to the microwheels 204a, 204b, 204c. In the embodiment depicted in FIG. 3, power is delivered to the electromagnetic coils 224, 226 to generate a magnetic field that induces the rotor wafer 212 to levitate and to spin between the upper and lower stator wafers 208, 210. The speed at which the rotor wafer 212 spins may be controlled by varying the amount of current that flows through the wires 248. The spinning of the rotor wafer 212 allows the microwheel 204 to act as a flywheel. When only one of the microwheels rotates, it creates a small amount of momentum, however, when all three microwheels 204a, 204b, 204c rotate in the same direction, the vehicle control system 200 the amount of momentum is tripled. Thus, when an even greater number of microwheels 204 is employed in the vehicle control system 200, a large amount of momentum can be created. This momentum can then be controlled by manipulating the slats 106 and tilting the slats 106 from one position to another. Thus, when the slats 106 are ready to be moved, the actuator 104 is actuated to control the attitude and/or momentum of the vehicle 100 in all three axes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A vehicle control system, comprising:
   a slat having a longitudinal axis, a first edge, and a second edge;
   a plurality of microwheels disposed on the slat, each microwheel having a first stator wafer, a second stator wafer, and a rotor wafer disposed therebetween, the first and second stator wafers configured to spin the rotor wafer; and
   an actuator configured to at least partially rotate the slat about the longitudinal axis, the actuator including a first portion coupled to the slat first edge, a second portion coupled to the slat second edge, a cord, and an actuating mechanism, the cord coupled to the first and second edges and the actuating mechanism.

2. The vehicle control system of claim 1, wherein the first and second stator wafers each have an inner surface that defines a cavity and the rotor wafer is disposed within the cavities.

3. The vehicle control system of claim 1, wherein the first and second stator wafers are configured to magnetically levitate and spin the rotor wafer.

4. The vehicle control system of claim 1, wherein the first and second stator wafers are configured to electromagnetically levitate and spin the rotor wafer.

5. The vehicle control system of claim 1, wherein the first and second stator wafers each have electrical circuitry embedded therein.

6. The vehicle control system of claim 5, wherein each stator wafer includes an electromagnetic coil coupled thereto and each electromagnetic coil is in communication with the electrical circuitry.

7. The vehicle control system of claim 6, wherein the first and second stator wafers each include a magnet and the magnet of the first stator wafer and the magnet of the second stator wafer are configured to have opposite magnetic polarities.

8. The vehicle control system of claim 5, wherein the slat has electrical connections and the slat electrical connections are coupled to the first and second stator wafer electrical circuitry.

9. The vehicle control system of claim 1, wherein the rotor wafer has a first side and a second side, the rotor is disposed between the stator wafers such that the first side is adjacent a bottom of the first stator and the second side is adjacent a top of the second stator, wherein the first stator has a first magnetic polarity, the second stator has a second magnetic polarity, the rotor first side has a magnetic polarity opposite from the first magnetic polarity and the rotor second side has a magnetic polarity opposite from the second magnetic polarity.

10. The vehicle control system of claim 9, wherein the rotor wafer further comprises a silicon disk and a first and second magnets, the first and second magnets coupled to the rotor wafer first and second sides, respectively.

11. The vehicle control system of claim 1 wherein the stator wafers are configured to electrostatically levitate and spin the rotor wafer.

12. The vehicle control system of claim 1, wherein each microwheel is configured to spin in the same direction.

13. The vehicle control system of claim 1, wherein:
   the actuator further comprises a rod and an actuating mechanism, the rod coupled to the actuating mechanism and one of the first and second edges.

14. The vehicle control system of claim 1, further comprising a first wall and a second wall, wherein the slat is disposed therebetween.

15. The vehicle control system of clam 14, wherein the actuator is disposed between the first and second wall.

16. A spacecraft control system comprising:

a plurality of slats each having a longitudinal axis, a first edge, and a second edge;

a plurality of microwheels disposed on the slat, each microwheel having a first stator wafer, a second stator wafer, and a rotor wafer disposed therebetween, the first and second stator wafers configured to levitate and spin the rotor wafer; and an actuator coupled to the plurality of slats and configured to rotate each of the slats about its longitudinal axis, the actuator including a first portion coupled to the first edge of each slat, a second portion coupled to the second edge of each slat, a cord, and an actuating mechanism, the cord coupled to the first and second edges and the actuating mechanism.

17. The vehicle control system of claim 16, wherein:

the actuator further comprises a rod and an actuating mechanism, the rod coupled to the actuating mechanism and one of the first and second edges.

18. The vehicle control system of claim 16, further comprising a first wall and a second wall, wherein the plurality of slats is disposed therebetween.

19. The vehicle control system of clam 18, wherein the actuator is disposed between the first and second wall.

20. A vehicle, comprising:

a housing;

a plurality of slats disposed within the housing, each slat including a longitudinal axis, a first edge, and a second edge;

a plurality of microwheels disposed on each of the slats, each microwheel having a first stator wafer, a second stator wafer, and a rotor wafer disposed therebetween, the first and second stator wafers configured to spin the rotor wafer; and an actuator including a first portion coupled to the first edge of each slat, a second portion coupled to the second edge of each slat, a cord, and an actuating mechanism, the cord coupled to the first and second edges and the actuating mechanism.

21. The vehicle of claim 20, wherein:

the actuator further comprises a rod and an actuating mechanism, the rod coupled to the actuating mechanism and one of the first and second edges.

22. The vehicle of claim 20, further comprising a first wall and a second wall, wherein the plurality of slats is disposed therebetween.

23. The vehicle of clam 22, wherein the actuator is disposed between the first and second wall.

24. The vehicle of claim 22, wherein the first wall is coupled to the housing.

* * * * *